United States Patent
Loeffler-Lejeune (10) Patent No.: US 7,224,706 B2
(45) Date of Patent: May 29, 2007

(54) HITLESS RE-ROUTING IN COMPOSITE SWITCHES

(75) Inventor: Christoph Dominique Loeffler-Lejeune, Sunnyvale, CA (US)

(73) Assignee: Bay Microsystems, Inc., San Jose, CA (US)

( * ) Notice: Subject to any disclaimer, the term of this patent is extended or adjusted under 35 U.S.C. 154(b) by 983 days.

(21) Appl. No.: 09/941,894

(22) Filed: Aug. 28, 2001

(65) Prior Publication Data

US 2003/0048776 A1    Mar. 13, 2003

(51) Int. Cl.
H04J 3/06      (2006.01)
H04J 14/08     (2006.01)

(52) U.S. Cl. .................. 370/508; 370/395.7; 370/516; 398/99

(58) Field of Classification Search ...................... None
See application file for complete search history.

(56) References Cited

U.S. PATENT DOCUMENTS 5,825,821 A * 10/1998 Okuyama ................... 375/260
6,067,304 A * 5/2000 Nishioka ..................... 370/516
6,246,668 B1 * 6/2001 Kusyk ......................... 370/228
6,535,479 B1 * 3/2003 Ikematsu ..................... 370/220
6,970,480 B2 * 11/2005 van Heyningen et al. .. 370/508
2002/0118668 A1 * 8/2002 Sawey et al. ............... 370/350

* cited by examiner

Primary Examiner—Alpus H. Hsu
Assistant Examiner—Clemence Han (57) ABSTRACT

A method of the grooming traffic signals through a composite switch is disclosed that enables a traffic signal that is being transmitted between any two constituent switches to be re-routed through the composite switch without a hit (i.e., the dropping, replacing, inserting, or repeating of at least one bit in the traffic signal). This applies whether the constituent switches are adjacent in the composite switch or not. The composite switch in accordance with the illustrative embodiment comprises multiple routes between adjacent constituent switches and incorporates a mechanism that compensates for differential propagation delays along the routes. And still furthermore, the composite switch in accordance with the illustrative embodiment comprises alternative routes through different constituent switches and incorporates a mechanism that compensates for differential propagation delays through the constituent switches.

3 Claims, 6 Drawing Sheets

HITLESS RE-ROUTING IN COMPOSITE SWITCHES

FIELD OF THE INVENTION

The present invention relates to telecommunications in general, and, more particularly, to a novel architecture for composite switches.

BACKGROUND OF THE INVENTION

The first generation of optical fiber systems in the public telephone network used proprietary architectures, equipment line codes, multiplexing formats, and maintenance procedures. This diversity complicated the task of the Regional Bell Operating Companies and the interexchange carriers who needed to interface their equipment with these diverse systems.

To ease this task, Bellcore initiated an effort to establish a standard for connecting one optical fiber system to another. That standard is officially named the Synchronous Optical Network but it is more commonly called "SONET." The international version of the standard is officially named the Synchronous Digital Hierarchy but it is more commonly called "SDH."

Although differences exist between SONET and SDH, those differences are mostly in terminology. In virtually all practical aspects, the two standards are the same, and, therefore, virtually all equipment that complies with either the SONET standard or the SDH standard also complies with the other. For the purposes of this specification, the combined acronym/initialism "SONET/SDH" is defined as the Synchronous Optical Network or the Synchronous Digital Hierarchy or both.

Figure 1:
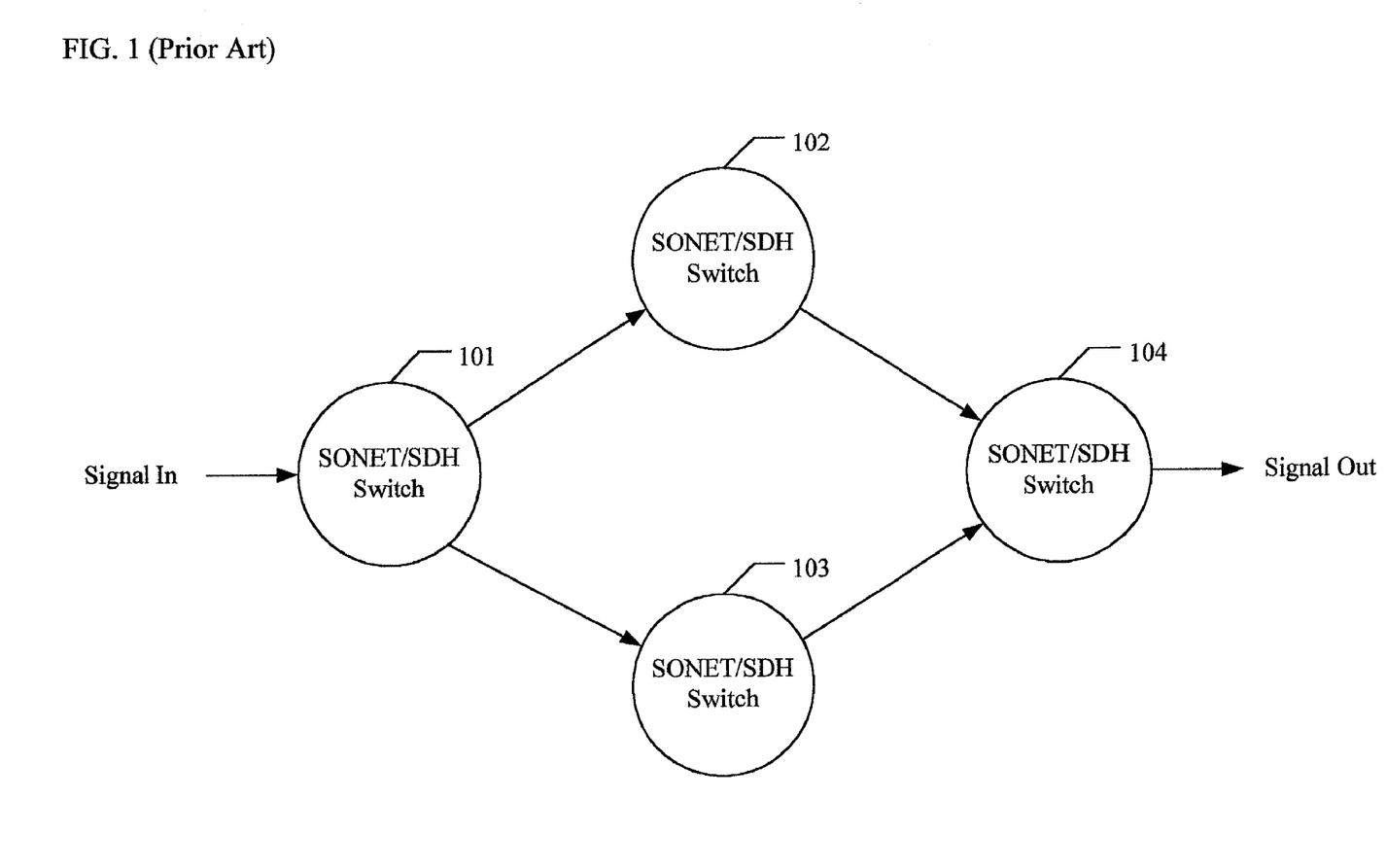
FIG. 1 depicts a block diagram of portion of a SONET/SDH network in the prior art.

FIG. 1 depicts a block diagram of a portion of a SONET/SDH network that receives a traffic signal at SONET/SDH switch 101 and transmits the signal from SONET/SDH switch 104. For example, the network might originally transmit the traffic signal from SONET/SDH switch 101 to SONET/SDH switch 104 through SONET/SDH switch 102. In the course of provisioning and deprovisioning the available resources, the need can arise whereby a traffic signal is carried from SONET/SDH switch 101 to SONET/SDH switch 104 through SONET/SDH switch 103, rather than through SONET/SDH switch 102. Analogously, the need can arise whereby a traffic signal is carried from SONET/SDH switch 101 to SONET/SDH switch 104 through SONET/SDH switch 102, rather than through SONET/SDH switch 103. These needs often occur when grooming is performed.

If there is a difference in the propagation delay through SONET/SDH switch 101 to SONET/SDH switch 104 through SONET/SDH switch 102, in contrast to the propagation delay through SONET/SDH switch 103, then the re-routing of the traffic signal through SONET/SDH switch 103 will cause the dropping, replacing, inserting, or repeating of at least one bit in the traffic signal. This is colloquially, although almost universally, called a "hit." Hits are not advantageous and therefore hitless re-routing is preferred.

If the user of a SONET/SDH network experiences infrequent hits, the hits are most likely to be tolerated. In contrast, if the user of the SONET/SDH network experiences frequent hits, the hits are unlikely to be tolerated. This places a practical limit on the number of hits that the operator of a SONET/SDH network can inflict on its users. Furthermore, the inability to inflict an arbitrarily large number of hits on a user hinders the ability of the operator to groom the network, and the operator of the network must be capable of freely grooming the network so as to maintain the resource utilization of the network.

Therefore, the need exists for a technique for the re-routing of synchronous signals without causing a large number of hits.

SUMMARY OF THE INVENTION

The present invention enables the grooming of traffic signals through a composite switch without some of the costs and disadvantages associated with techniques for doing so in the prior art. In particular, the illustrative embodiment enables a traffic signal that is being transmitted between any two constituent switches in a composite switch to be re-routed through the composite switch without a hit (i.e., the dropping, replacing, inserting, or repeating of at least one bit in the traffic signal). This applies whether the constituent switches are adjacent in the composite switch or not.

Furthermore, the composite switch in accordance with the illustrative embodiment comprises multiple routes between adjacent constituent switches and incorporates a mechanism that compensates for differential propagation delays along the routes. And still furthermore, the composite switch in accordance with the illustrative embodiment comprises alternative routes through different constituent switches and incorporates a mechanism that compensates for differential propagation delays through the constituent switches.

A further advantage of the illustrative embodiment is that it is largely fabricated from a plurality of identical and modular constituent switches that can be assembled in different numbers and topologies to form a variety of composite switches. In accordance with the illustrative embodiment, each constituent switch is fabricated on a single integrated circuit.

And still a further advantage of the illustrative embodiment is that it can be accomplished upon powering up the composite switch and without the presence of live traffic. This enables the composite switch to be fully synchronized before it carries live traffic.

The illustrative embodiment comprises: a first input port for receiving a first time division multiplexed signal that comprises a first series of frame boundaries; a second input port for receiving a second time-division multiplexed signal that comprises a second series of frame boundaries; a first frame position register whose contents are related to how far the first time-division multiplexed signal is from a frame boundary in the first time-division multiplexed signal at a point in time; and a second frame position register whose contents are related to how far the second time-division multiplexed signal is from a frame boundary in the second time-division multiplexed signal at the point in time.

DETAILED DESCRIPTION

Figure 2:
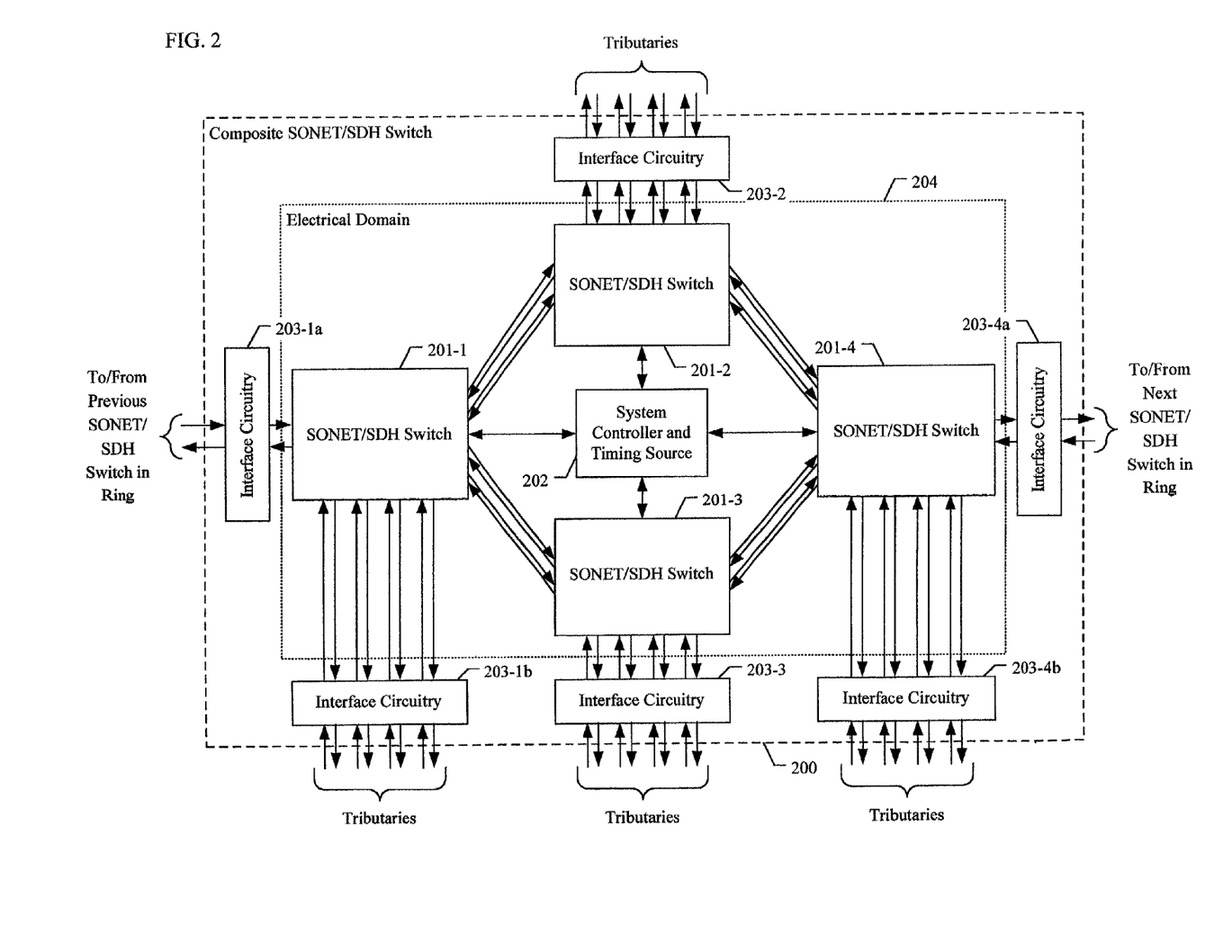
FIG. 2 depicts a block diagram of the illustrative embodiment of the present invention.

FIG. 2 depicts a block diagram of the salient components of composite SONET/SDH switch 200 in accordance with the illustrative embodiment of the present invention. For the purposes of this specification, a "switch" is defined as an apparatus that functions as:
i. a cross-connect, or
ii. an add-drop multiplexor, or
iii. a time-slot interchanger, or
iv. any combination of i, ii, and iii.

Furthermore, for the purposes of this specification, a "composite switch" is defined as an apparatus that comprises a plurality of interrelated constituent switches that share a common timing source.

For the purposes of this specification, a "SONET/SDH switch" is defined as a switch that is compliant with:
i. the Synchronous Optical Network (ie., SONET) standard, or
ii. the Synchronous Digital Hierarchy (ie., SDH) standard, or
iii. both i and ii.

For the purposes of this specification, a "composite SONET/SDH switch" is defined as an apparatus that comprises a plurality of interrelated constituent SONET/SDH switches that share a common timing source. Although differences exist between the SONET and SDH standards, it will be clear to those skilled in the art that the present invention is equally applicable for use with both standards.

In accordance with the illustrative embodiment, composite SONET/SDH switch 200 is a node in a SONET/SDH ring network (not shown). It will be clear to those skilled in the art, however, that in some alternative embodiments of the present invention composite SONET/SDH switch 200 can be a node in the address space of:
i. one or more SONET/SDH ring networks, or
ii. one or more SONET/SDH mesh networks, or
iii. any combination of i and ii.

For an example of how composite SONET/SDH switch 200 can be a node in the address space of multiple SONET/SDH networks, see U.S. patent application Ser. No. 09/909,550, filed Jul. 19, 2001, which application is incorporated by reference. Furthermore, it will be clear to those skilled in the art that the present invention is also useful with synchronous ring and mesh networks that are not SONET or SDH compliant.

Composite SONET/SDH switch 200 comprises SONET/SDH switches 201-1 through 201-4, system controller and timing source 202, and interface circuitry 203-1a through 203-4b, interconnected as shown (in a double bidirectional ring topology). In some alternative embodiments of the present invention, however, composite SONET/SDH switch 200 comprises a different number of constituent SONET/SDH switches. Furthermore, in some alternative embodiments of the present invention, the constituent SONET/SDH switches are interconnected in a different topology (e.g., in a single ring topology, in a mesh topology, etc.).

Any constituent SONET!SDH switch in composite SONET/SDH switch 200 can transmit traffic to its adjacent constituent SONET/SDH switches via z independent buses, wherein z is a positive integer greater than zero. In the illustrative embodiment, z=2. In some alternative embodiments of the present invention, some pairs of adjacent constituent SONET/SDH switches communicate via a different number of pairs of directional buses than do other pairs of adjacent constituent SONET/SDH switches.

In accordance with the illustrative embodiment, the propagation delay along any bus in electrical domain 204 can be different than the propagation delay along any other bus in electrical domain 204, and the illustrative embodiment will compensate for this difference. The fact that the illustrative embodiment compensates for these different propagation delays enables the hitless re-routing of uni-directional and bi-directional signals between any two constituent SONET/SDH switches in composite SONET/SDH switch 200, whether the constituent SONET/SDH switches are adjacent or not. For example, a bidirectional traffic signal between SONET/SDH switch 201-1 and SONET/SDH switch 201-2 on bus 1 can be re-routed to bus 2 without a hit. As another example, a bi-directional traffic signal between SONET/SDH switch 201-1 and SONET/SDH switch 201-4 through SONET/SDH switch 201-2 can be re-routed through SONET/SDH switch 201-3 without a hit.

Each constituent SONET/SDH switch in composite SONET/SDH switch 200 transmits time-division multiplexed signals to the other constituent SONET/SDH switches. As is well known to those skilled in the art, a time-division multiplexed signal comprises a series of SONET/SDH frames that are defined by a series of frame boundaries. For example, the SONET/SDH A1 and A2 framing bytes (i.e., the bytes at row 1, columns 1 and 2) demarcate the boundary between adjacent SONET/SDH frames.

In the illustrative embodiment, all processing and transport within electrical domain 204 is electrical, in contrast to optical. Interface circuitry 203-1a and 203-4a convert between optical and electrical signals for receiving signals from and transmitting signals onto the SONET/SDH ring. In some alternative embodiments of the present invention, however, the transmissions between some or all of constituent SONET/SDH switches 201-1 through 201-4 are optical and interface circuitry is present on both ends of each connection between constituent SONET/SDH switches 201-1 through 201-4 to convert into and out of the optical domain. It will be clear to those skilled in the art how to make and use such interface circuitry.

Furthermore, all of the constituent SONET/SDH switches in composite SONET/SDH switch 200 receive and spawn tributaries, in well known fashion, and in accordance with the SONET/SDH protocol standard or a variety of other protocols (e.g., Gigabit Ethernet, Fiber Channel, ATM, etc.). Interface circuitry 203-1b, 203-2, 203-3, and 203-4b convert between electrical signal in electrical domain 204 and whatever kinds of signals are presented or needed on the respective tributaries. It will be clear to those skilled in the art how to make and use interface circuitry 203-1a through 203-4b. In some alternative embodiments of the present invention, however, some of the buses carry optical signals.

Each bus entirely within electrical domain 204 is p bits wide, wherein p is a positive integer greater than zero. In accordance with the illustrative embodiments, p=32. In some alternative embodiments of the present invention, however, some buses have a different width than some other buses.

System controller and timing source 202 performs three independent, but interrelated, functions:

i. it provides a system clock signal to all of the constituent SONET/SDH switches in composite SONET/SDH switch 200 so that they all run off of a common clock, ii. it directs how each SONET/SDH switch in composite SONET/SDH switch 200 should process each signal it receives, and iii. it adjusts each of the constituent SONET/SDH switches to enable hitless switching between them.

The first function is performed by a timing source, in well-known fashion. The second and third functions are performed by a microprocessor capable of providing the functionality described below and with respect to FIGS. 5 and 6. In some alternative embodiments of the present invention, the second function is performed by one or more processors and the third function is performed by one or more other processors.

Figure 3:
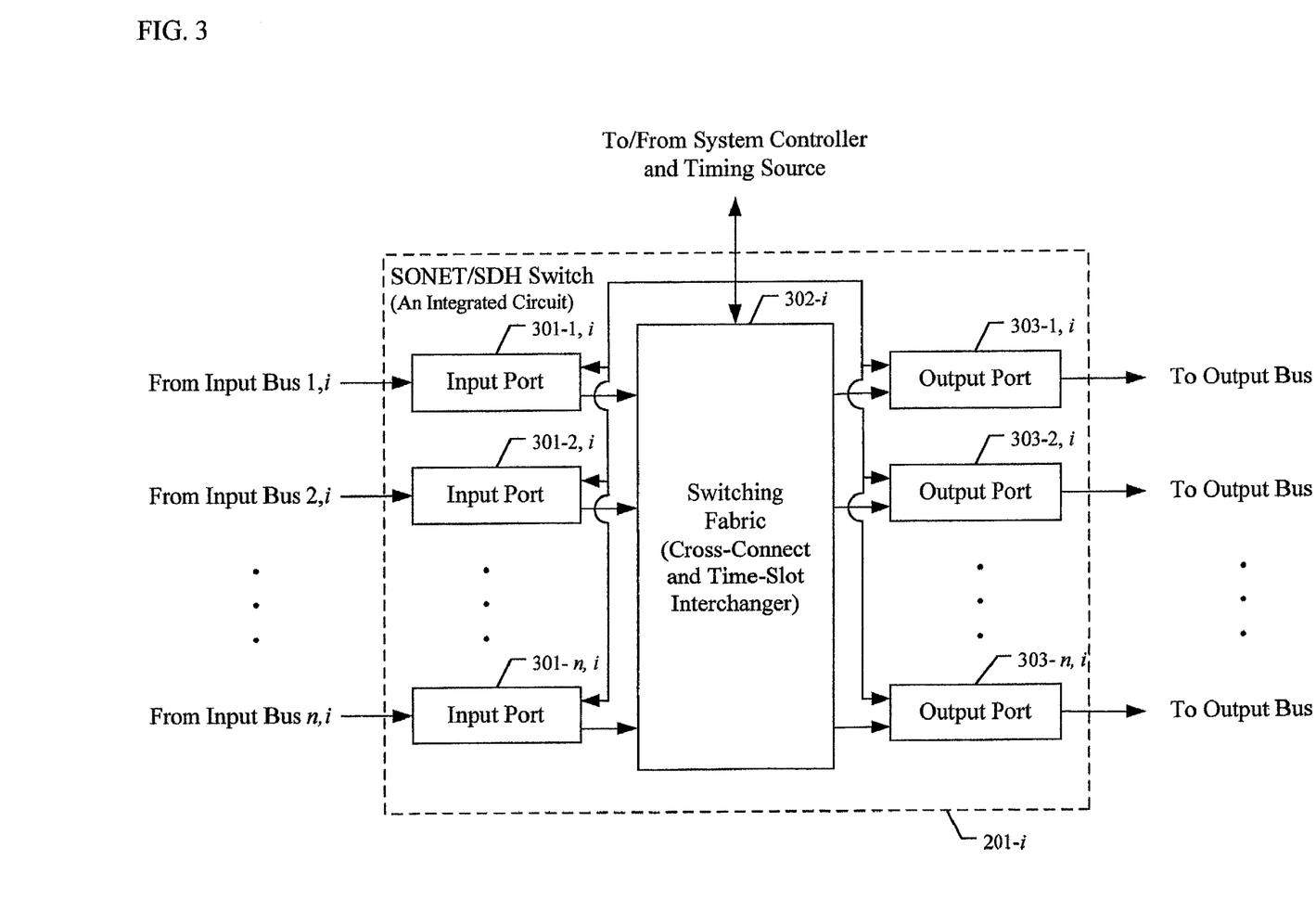
FIG. 3 depicts a block diagram of a SONET/SDH switch in accordance with the first and second illustrative embodiments of the present invention.

FIG. 3 depicts a block diagram of the salient components of SONET/SDH switch 201-$i$, for i-1 to 4, in accordance with the illustrative embodiment of the present invention. Each constituent SONET/SDH switch in composite SONET/SDH switch 200 is identically fabricated on a single integrated circuit. For the purposes of this specification, the term "integrated circuit" is defined as a slice or chip of material on which is etched or imprinted a complex of electronic components and their interconnections. One advantage of the illustrative embodiment is that it comprises a plurality of identical and modular components (i.e., SONET/SDH switch 201-$i$) that can be assembled in different numbers and topologies to form a variety of composite SONET/SDH switches.

As shown in FIG. 3, SONET/SDH switch 201-$i$ receives a signal from each of input buses 1,i through n, i and outputs a signal on each of output buses 1 through n. In accordance with the illustrative embodiment, SONET/SDH switch 201-$i$ receives the same number of signals as it outputs (i.e., SONET/SDH switch 201-$i$ is an n by n switch). It will be clear to those skilled in the art, however, that a switch in accordance with some alternative embodiments of the present invention can receive a different number of signals than it outputs (i.e., the switch is an n by m switch).

SONET/SDH switch 201-$i$ comprises: input ports 301-1 through 301-$n$, switching fabric 302, and output ports 303-1 through 303-$n$. The output of input ports 301-1 through 301-$n$, switching fabric 302-$i$ and output ports 303-1 to 303-$n$ all receive the system clock signal directly from system controller and timing source 202 and, therefore, run synchronously. The input of input ports 301-1 through 301-$n$ is clocked synchronously with the incoming signals generated at the output of the constituent SONET/SDH switch or the interface circuitry that generated the incoming signals. In other words, the input of input ports 301-1 through 301-$n$ and the output of input ports 301-1 through 301-$n$ operate at the same clock frequency, but can have a disparate phase relationship. Furthermore, the disparate phase relationship can change over time.

As will be described in detail below and with respect to FIGS. 4 through 6, each input port that receives a time-division multiplexed signal from another SONET/SDH switch in composite SONET/SDH switch 200:

i. temporally buffers the signal, ii. performs SONET/SDH section and line termination for the signal, iii. retimes the signal, iv. passes the retimed signal to switching fabric 302, and v. maintains a count that is related to how far the signal is from a frame boundary at each point in time.

How the input port achieves this is described below and with respect to FIGS. 4 though 6.

Switching fabric 302-$i$ comprises:

i. a cross-connect for routing any SONET STS-1 or SDH STM-1 signal from any of input ports 301-1 through 301-$n$ to any of output ports 303-1 through 303-$n$; and ii. a time-slot interchanger for changing the STS slot of any STS-1 or STM-1 signal in any time-division multiplexed signal, under the direction of system controller and timing source 202. In other words, system controller and timing source 202 controls all of the routing of signals through composite SONET/SDH switch 200. It will be clear to those skilled in the art how to make and use switching fabric 302.

Each of output ports 303-1 through 303-$n$ outputs a time-division multiplexed signal and performs SONET/SDH section and line generation for the signal. It will be clear to those skilled in the art how to make and use each of output ports 303-1 through 303-$n$.

Figure 4:
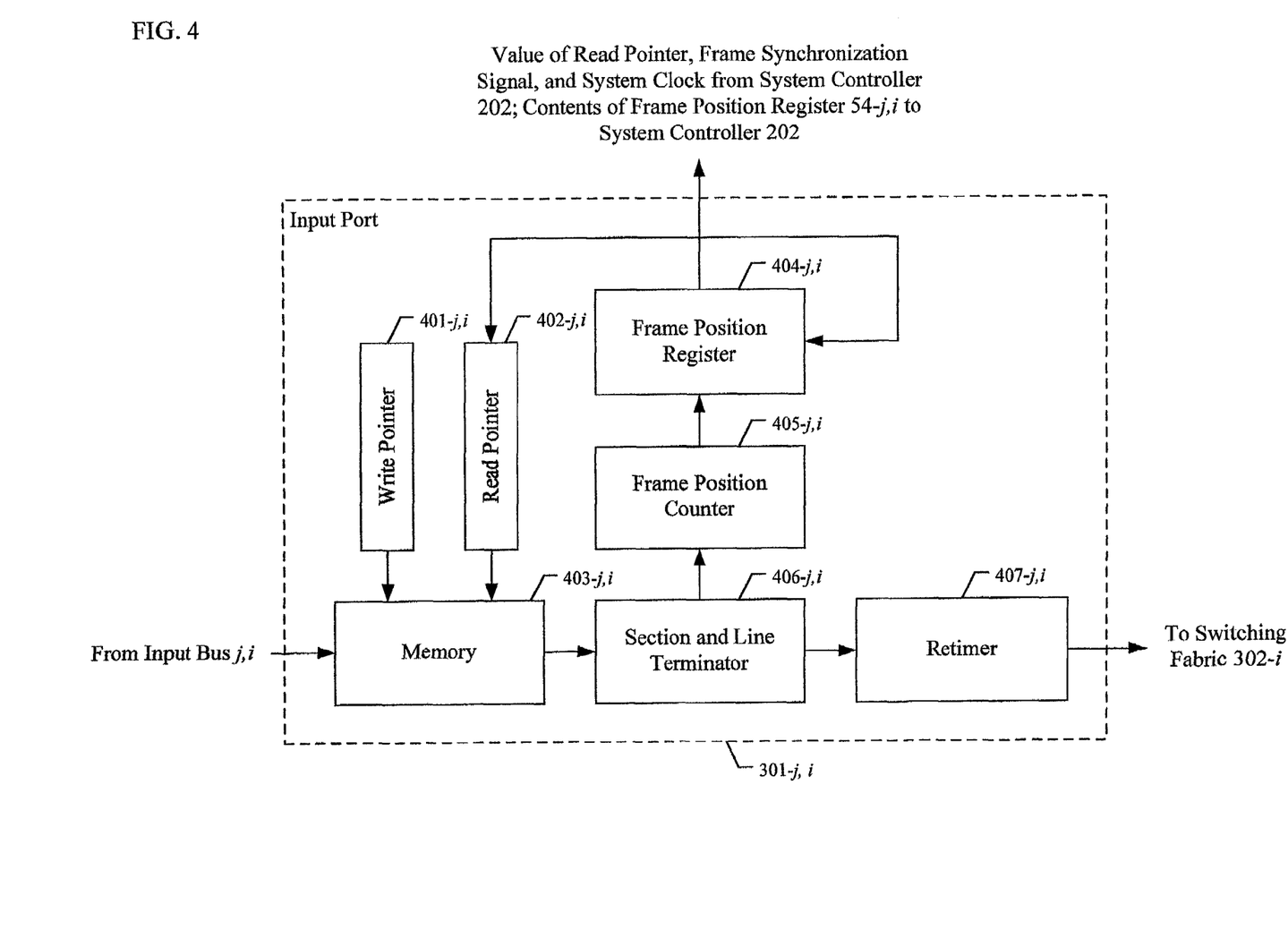
FIG. 4 depicts a block diagram of an input port in accordance with the SONET/SDH switch depicted in FIG. 3.

FIG. 4 depicts a block diagram of input port 301-$j$, for j=1 to n, in accordance with the SONET/SDH switch depicted in FIG. 3. Input port 301-$j$ comprises: write pointer 401-$j$, read pointer 402-$j$, memory 403-$j$, frame position register 404-$j$, frame position counter 405-$j$, section and line terminator 406-$j$, and retimer 407-$j$.

Write pointer 401-$j$, read pointer 402-$j$, and memory 403-$j$ together function as a p-bit wide by k word deep first-in, first-out memory ("FIFO"). In accordance with the illustrative embodiments of the present invention, p=32 to match the width of the buses between SONET/SDH switches 201-1 through 201-4. In accordance with the illustrative embodiment of the present invention, the minimum depth of memory 403-$j$ equals:

$$\lfloor D \times B \rfloor + 2 \qquad \text{(Eq. 1)}$$

where D is the maximum differential propagation delay, as measured in seconds, between any two routes through composite SONET/SDH switch 200 with the same starting and ending points, and B is the bus bandwidth as measured in words per second. For example, if D is 60 nanoseconds, and B is 311 Megawords per second, then the minimum depth of memory 403-$j$ is 20 words.

Write pointer 401-$j$ is a $\log_2 k$-bit (i.e., modulo k) up counter that is incremented once for each word written into memory 403-$j$. Upon initialization and restart, the initial value of write pointer 401-$j$ is zero. As stated above, write pointer 401-j is clocked in phase and frequency with the arrival of incoming words.

Read pointer 402-$j$ is a $\log_2 k$-bit (i.e., modulo k) up counter that is incremented once for each word read from memory 403-$j$. Upon initialization and restart, the initial value of the offset value, $o_j$, is two (2). The value in read pointer 402-$j$ can be affected by system controller and timing source 202 by writing an offset, $o_{j,i}$, into read pointer 402-$j$ such that the new value in read pointer 402-$j$ equals the old value in read pointer 402-$j$ plus the offset, $o_{j,i}$. How the offset, $o_{j,i}$, is determined and when it is written into read pointer 402-$j$ is described in detail below.

As stated above, read pointer 402-$j$ is clocked in phase and frequency with the system clock as it arrives at SONET/SDH switch 201-$i$.

In accordance with the illustrative embodiment, there is a frame boundary once every G words that section and line terminator 406-$j$ receives in the temporally buffered signal from memory 403-$j$, wherein G is a positive integer greater than one. In accordance with the illustrative embodiment, each input receives an OC-192, which has 192 STS's per frame and 810 bytes per STS and 4 bytes per word, and, therefore the value of G=38,880. In some alternative embodiments of the present invention, some inputs receive a different rate signal and some other alternative embodiments of the present invention (e.g., an OC-768, etc.), some inputs receive a different rate signal (e.g., an OC-768, etc.) than other inputs receive (e.g., an OC-192, etc.).

Frame position register 404-j, frame position counter 405-j, and section and line terminator 406-j together function to provide system controller and timing source 202 with a number that is related to how far the signal arriving at input port 301-j is from a frame boundary at a point in time dictated by system controller and timing source 202.

As described in detail below and with respect to FIGS. 5 and 6, system controller and timing source 202 uses this information, along with same kind of information from other input ports on the same and other SONET/SDH switches in composite SONET/SDH switch 200, to determine the values stored in read pointer 402-j.

The contents of frame position register 404-j need not exactly specify the current position in the signal as measured from a frame boundary, but instead can be measured from a fixed position within a frame such that the number is related to how far the signal is from a frame boundary. In other words, the number, plus or minus a constant, should equal the current position in the signal as measured from a frame boundary.

Frame position register 404-j is a parallel load in, parallel read out $\log_2 G$-bit register that loads and holds the contents of frame position counter 405-j at a point in time indicated by system controller and timing source 202. In other words, frame position register 404-j enables system controller and timing source 202 to take a snapshot of frame position counter 405-j at a point in time indicated by system controller and timing source 202. Advantageously, system controller and timing source 202 takes a snapshot of all of the frame position counters in composite SONET/SDH switch 200 simultaneously so that it can compare their values and intelligently populate all of the read pointers 402-j's in composite SONET/SDH switch 200. It will be clear to those skilled in the art how to make and use frame position register 404-j.

Frame position counter 405-j is advantageously a $\log_2 G$-bit (i.e., modulo G) up counter that is:

i. reset upon the detection of a frame boundary by section and line terminator 406-j, and ii. incremented once for each word that section and line terminator 406-j receives since the last frame boundary.

It will be clear to those skilled in the art how to make and use frame position counter 405-j. Furthermore, it will be clear to those skilled in the art that in some alternative embodiments of the present invention, position counter 405-j can be a down-counter. And yet furthermore, it will be clear to those skilled in the art that in some alternative embodiments of the present invention, frame position register 404-j and frame position counter 405-j can be combined (e.g., as a counter with two clock enables—one from section and line terminator 406-j and one from system controller and timing source 202, etc.).

Section and line terminator 406-j receives the temporally buffered signal from memory 403-j and removes the section and line overhead from the signal, in well-known fashion, and passes the payload to retimer 407-j. Section and line terminator 406-j also detects frame boundaries in the arriving signal, in well-known fashion, and outputs to frame position counter 405-j an indication of each word that it has received since the last frame boundary. When section and line terminator 406-j detects another frame boundary, section and line terminator 406-j resets frame position counter 405-j.

Retimer 407-j receives the payload and performs positive or negative frequency justification, if necessary, in well-known fashion. When the signal arriving at input port 301-j has been transmitted from a SONET/SDH switch in composite SONET/SDH switch 200, and, therefore, both switches have a common timing source, no frequency justification is necessary. From retimer 407-j, the signal is output to switching fabric 302.

Figure 5:
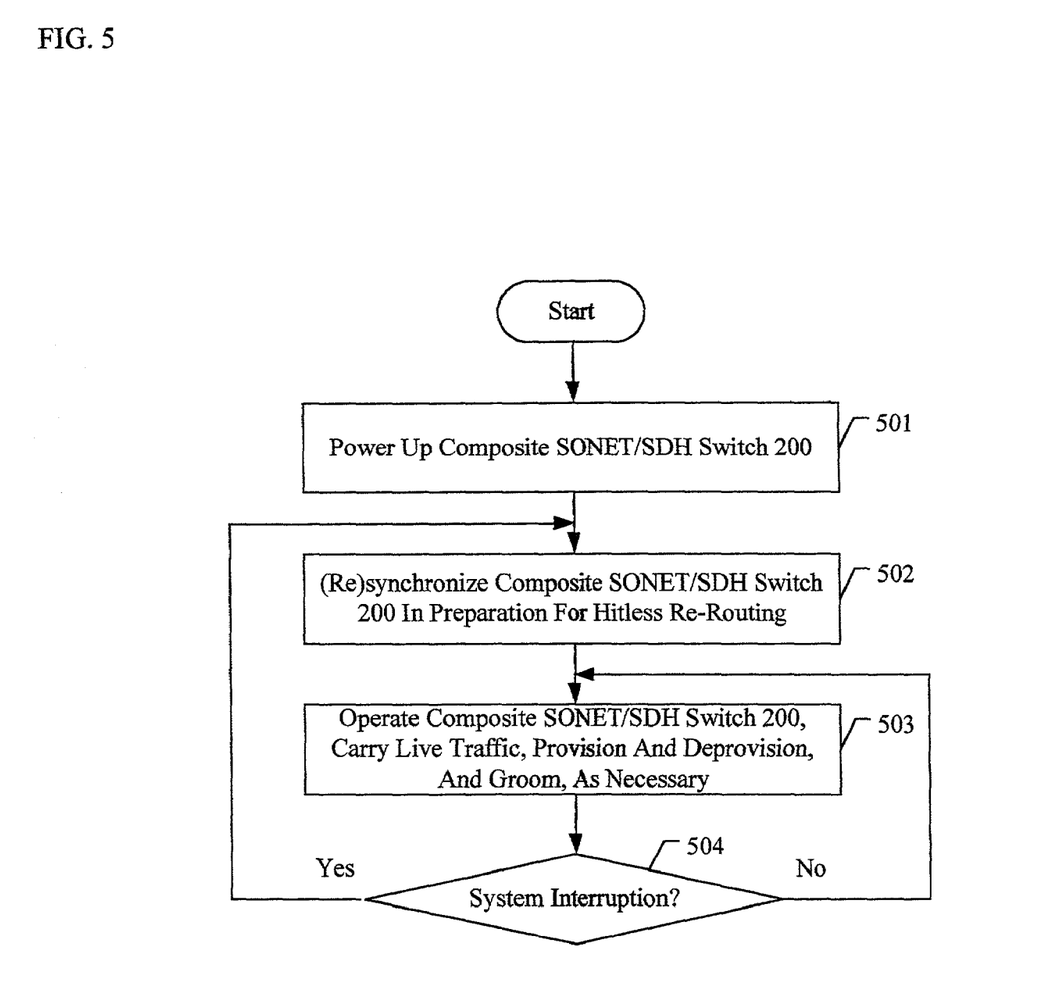
FIG. 5 depicts a flowchart of the operation of composite SONET/SDH switch 200 in accordance with the illustrative embodiment.

FIG. 5 depicts a flowchart of the operation of composite SONET/SDH switch 200.

At task 501, composite SONET/SDH switch 200 is powered up in well-known fashion.

At task 502, system controller and timing source 202 synchronizes all of the individual SONET/SDH switches in composite SONET/SDH switch 200 so that hitless re-routing in composite SONET/SDH switch 200 can be accomplished. Task 502 is described in detail below and with respect to FIG. 6. Task 502 can be accomplished before live traffic is carried by composite SONET/SDH switch 200.

At task 503, composite SONET/SDH switch 200 carries live traffic and grooming can be performed by re-routing live signals from one SONET/SDH switch in composite SONET/SDH switch 200 to another SONET/SDH switch in composite SONET/SDH switch 200 without a hit. Advantageously, grooming is performed after each deprovisioning operation involving SONET/SDH switch 200. It will be clear to those skilled in the art how to perform task 503.

At task 504, system controller and timing source 202 determines if there has been a full or partial system interruption caused by, for example, the resetting of one or more of the SONET/SDH switches in composite SONET/SDH switch 200. If there has, then control passes to step 502; otherwise control passes to step 503. When there has been a full system interruption, then all of the SONET/SDH switches in composite SONET/SDH switch 200 are resynchronized. In contrast, when there has been only a partial system interruption, the newly restored SONET/SDH switches are synchronized to conform with the timing of the SONET/SDH switches whose operation was not interrupted.

Figure 6:
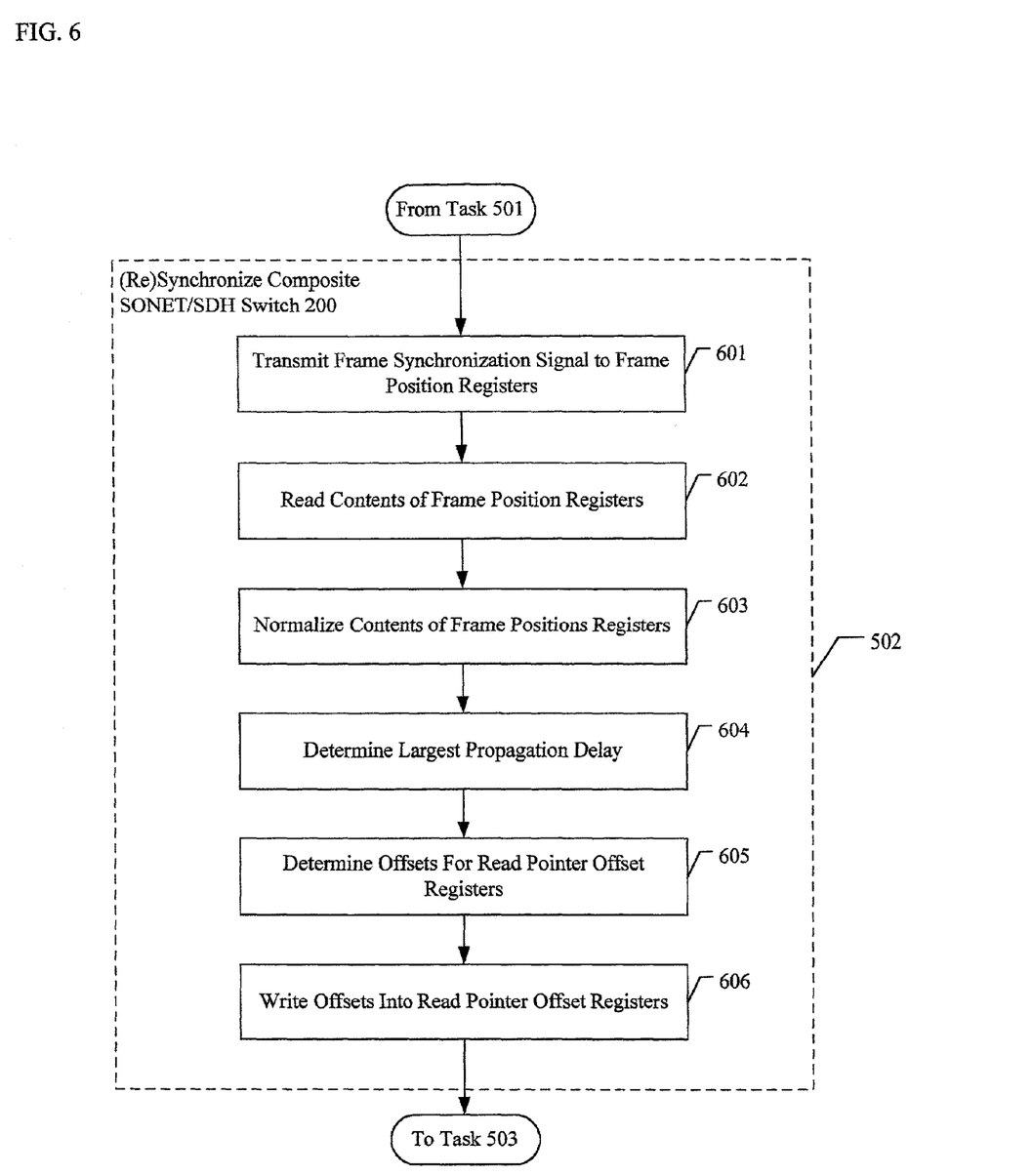
FIG. 6 depicts a flowchart of the subtasks associated with task 502, as depicted in FIG. 5.

FIG. 6 depicts a flowchart of the subtasks associated with task 502.

At subtask 601, system controller and tiring source 202 transmits a frame synchronization signal to frame position register 404-j,i, for j=1 to 4 and i=1 to 4. This enables system controller and timing source 202 to sample the contents of frame position counter 405-j,i.

At subtask 602, system controller and timing source 202 reads the contents of frame position register 404-j,i, which is denoted by $fpr_{j,i}$. Table 1 depicts sixteen illustrative values from the sixteen frame position registers in the four SONET/SDH switches.

TABLE 1

Illustrative Contents of Sixteen Frame Position Pointers

| SONET/SDH Switch 201-j | Input Port 301-j,i | $fpr_{j,i}$ |
|---|---|---|
| 201-1 | 301-1,1 | 5 |
|  | 301-1,2 | 38,877 |
|  | 301-1,3 | 2 |
|  | 301-1,4 | 1 |
| 201-2 | 301-2,1 | 38,874 |
|  | 301-2,2 | 38,879 |
|  | 301-2,3 | 5 |
|  | 301-2,4 | 38,879 |
| 201-3 | 301-3,1 | 4 |
|  | 301-3,2 | 9 |
|  | 301-3,3 | 38,878 |
|  | 301-3,4 | 38,875 |

TABLE 1-continued

Illustrative Contents of Sixteen Frame Position Pointers

| SONET/SDH Switch 201-j | Input Port 301-j,i | $fpr_{j,i}$ |
|---|---|---|
| 201-4 | 301-4,1 | 7 |
|  | 301-4,2 | 4 |
|  | 301-4,3 | 38,877 |
|  | 301-4,4 | 38,877 |

At subtask 603, normalizes the values of $fpr_{j,i}$ in preparation for determining which frame position register's contents represents the longest propagation delay. This normalization is necessary because frame position register 404-j,i captures the contents of a modulo G counter, and, therefore, smaller numbers do not necessarily represent longer propagation delays than larger numbers. The normalized value of frame position register 404-j,i, $nv_{j,i}$, equals:

$$nv_{j,i} = (fpr_{j,i} + G/2) \text{ modulo } G \quad \text{(Eq. 3)}$$

The normalized values of the contents of the frame position registers are depicted in Table 2.

TABLE 2

Normalized Contents of Sixteen Frame Position Pointers

| SONET/SDH Switch 201-j | Input Port 301-j,i | $fpr_{j,i}$ | $nv_{j,i}$ |
|---|---|---|---|
| 201-1 | 301-1,1 | 5 | 19,445 |
|  | 301-1,2 | 38,877 | 19,437 |
|  | 301-1,3 | 2 | 19,442 |
|  | 301-1,4 | 1 | 19,441 |
| 201-2 | 301-2,1 | 38,874 | 19,434 |
|  | 301-2,2 | 38,879 | 19,439 |
|  | 301-2,3 | 5 | 19,445 |
|  | 301-2,4 | 38,879 | 19,439 |
| 201-3 | 301-3,1 | 4 | 19,444 |
|  | 301-3,2 | 9 | 19,449 |
|  | 301-3,3 | 38,878 | 19,438 |
|  | 301-3,4 | 38,875 | 19,435 |
| 201-4 | 301-4,1 | 7 | 19,447 |
|  | 301-4,2 | 4 | 19,444 |
|  | 301-4,3 | 38,877 | 19,437 |
|  | 301-4,4 | 38,877 | 19,437 |

At subtask 604, system controller and timing source 202 determines the largest propagation delay by locating the smallest normalized value computed in subtask 603. When frame position register 405-j,i is an up counter, the smallest normalized value computed in subtask 603 represents the input port that is the most behind. From Table 2, the smallest normalized value is 19,434, which is associated with $nv_{1,2}$. Because this represents the longest propagation delay, each of the other input ports will have to be delayed to coincide with this value.

At subtask 605, system controller and timing source 202 determines the offset, $o_{j,i}$, to be written into read pointer 402-j,i.

The value of the offset to be written into a read pointer is equal to:

$$o_{j,i} = nv_{j,i} - \text{minimum(of all } nv) \quad \text{(Eq. 4)}$$

From Table 2, it can be seen that the minimum(of all nv) equals 19,434. The normalized values of the contents of the frame position registers are depicted in Table 2.

TABLE 3

Calculated Offsets for All Sixteen Frame Position Pointers

| SONET/SDH Switch 201-j | Input Port 301-j,i | $o_{j,i}$ |
|---|---|---|
| 201-1 | 301-1,1 | 13 |
|  | 301-1,2 | 5 |
|  | 301-1,3 | 10 |
|  | 301-1,4 | 9 |
| 201-2 | 301-2,1 | 2 |
|  | 301-2,2 | 7 |
|  | 301-2,3 | 13 |
|  | 301-2,4 | 7 |
| 201-3 | 301-3,1 | 12 |
|  | 301-3,2 | 17 |
|  | 301-3,3 | 6 |
|  | 301-3,4 | 3 |
| 201-4 | 301-4,1 | 15 |
|  | 301-4,2 | 12 |
|  | 301-4,3 | 5 |
|  | 301-4,4 | 5 |

At subtask 606, system controller and timing source 202 writes into read pointer 402-j,i the value of the offset, $o_{j,i}$, which read pointer 402-j,i adds to the current value of the read pointer to create its new value. After subtask 606 has been completed, system controller and timing source 202 can re-reroute any signals through composite SONET/SDH switch 200 without incurring a hit.

In some alternative embodiments of the present invention, only some paths through composite SONET/SDH switch 200 are synchronized for hitless re-routing. In these cases, the latency through composite SONET/SDH switch 200 can typically be reduced in comparison to when system controller and timing source 202 can re-reroute any signals through composite SONET/SDH switch 200 without incurring a hit.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A composite switch comprising:
   a first integrated circuit for outputting a first time-division multiplexed signal that comprises a first series of frame boundaries to a second integrated circuit and for outputting a second time-division multiplexed signal that comprises a second series of frame boundaries to a third integrated circuit;
   wherein said second integrated circuit comprises:
   (i) a first input port for receiving said first time-division multiplexed signal,
   (ii) a first memory that stores said first time-division multiplexed signal at a location that is indicated by a first write pointer and that reads said first time-division multiplexed signal at a location that is indicated by a first read pointer,
   (iii) a first frame position register whose contents are related to how far said first time-division multiplexed signal is from a frame boundary in said first time-division multiplexed signal at a first point in time, and
   (iv) a first output port for outputting a third time-division multiplexed signal that is based on said first time-division multiplexed signal and that comprises a third series of frame boundaries;

wherein said third integrated circuit comprises:
- (i) a second input port for receiving said second time-division multiplexed signal,
- (ii) a second memory that stores said second time-division multiplexed signal at a location that is indicated by a second write pointer and that reads said second time-division multiplexed signal at a location that is indicated by a second read pointer,
- (iii) a second frame position register whose contents are related to how far said second time-division multiplexed signal is from a frame boundary in said second time-division multiplexed signal at said first point in time, and
- (iv) a second output port for outputting a fourth time-division multiplexed signal that is based on said second time-division multiplexed signal and that comprises a fourth series of frame boundaries;

a fourth integrated circuit comprising:
- (i) a third input port for receiving said third time-division multiplexed signal,
- (ii) a third memory that stores said third time-division multiplexed signal at a location that is indicated by a third write pointer and that reads said second time-division multiplexed signal at a location that is indicated by a third read pointer,
- (iii) a third frame position register whose contents are related to how far said third time-division multiplexed signal is from a frame boundary in said third time-division multiplexed signal at a second point in time,
- (iv) a fourth input port for receiving said fourth time-division multiplexed signal,
- (v) a fourth memory that stores said fourth time-division multiplexed signal at a location that is indicated by a fourth write pointer and that reads said fourth time-division multiplexed signal at a location that is indicated by a fourth read pointer,
- (vi) a fourth frame position register whose contents are related to how far said fourth time-division multiplexed signal is from a frame boundary in said fourth time-division multiplexed signal at said second point in time; and a controller for reading the contents of said first frame position register and said second frame position register, for storing a value in said first read pointer based on the contents of said first frame position register and said second frame position register, for reading the contents of said third frame position register and said fourth frame position register, and for storing a value in said third read pointer based on the contents of said third frame position register and said fourth frame position register.

2. The composite switch of claim 1 wherein said first point in time and said second point in time are the same.

3. A method comprising:

transmitting a Paine synchronization signal to frame position registers of multiple SONET/SDH switches;

reading contents of the frame position registers in response to the frame synchronization signal;

normalizing the contents of the frame position registers; determining propagation delays from the normalized contents of the frame position registers;

determining the largest propagation delay from the nonalized contents of the frame position registers;

determining port-specific offsets for read pointer offset registers of the multiple SONET/SDH switches as a function of the largest propagation delay; and writing the port-specific offsets into the read pointer offset registers.

* * * * *